(12) United States Patent
Sreenivasan et al.

(10) Patent No.: US 7,590,590 B2
(45) Date of Patent: Sep. 15, 2009

(54) METHOD AND SYSTEM FOR EXCHANGEABLE BUNDLED OPTION AND NO-PRINCIPAL DEBT SECURITIES

(75) Inventors: Santosh Sreenivasan, New York, NY (US); Jeffrey J. Zajkowski, Short Hills, NJ (US); Christopher Bishko, New York, NY (US); James A. Rothschild, New York, NY (US)

(73) Assignee: JPMorgan Chase Bank, New York, NY (US)

( * ) Notice: Subject to any disclaimer, the term of this patent is extended or adjusted under 35 U.S.C. 154(b) by 540 days.

(21) Appl. No.: 11/168,679

(22) Filed: Jun. 28, 2005

(65) Prior Publication Data

US 2006/0293986 A1 Dec. 28, 2006

(51) Int. Cl.
*G06Q 40/00* (2006.01)
(52) U.S. Cl. .................................... 705/37; 705/36 T
(58) Field of Classification Search .................. 705/35, 705/36 R, 39, 40, 1, 36 T
See application file for complete search history.

(56) References Cited

U.S. PATENT DOCUMENTS

| | | | |
|---|---|---|---|
| 4,588,192 A | 5/1986 | Laborde | |
| 4,648,038 A * | 3/1987 | Roberts et al. | 705/36 R |
| 6,205,433 B1 | 3/2001 | Boesch et al. | |
| 6,263,321 B1 | 7/2001 | Daughtery | |
| 6,381,585 B1 * | 4/2002 | Maples et al. | 705/36 R |
| 6,598,028 B1 | 7/2003 | Sullivan et al. | |
| 7,219,079 B2 | 5/2007 | Birle, Jr. et al. | |
| 7,246,094 B1 * | 7/2007 | Butcher | 705/39 |
| 7,257,555 B1 | 8/2007 | Farr | |
| 7,257,556 B1 | 8/2007 | Rifkin | |
| 2001/0056392 A1 * | 12/2001 | Daughtery, III | 705/36 |
| 2002/0087373 A1 | 7/2002 | Dickstein et al. | |
| 2003/0023536 A1 | 1/2003 | Hollerman | |
| 2003/0028467 A1 | 2/2003 | Sanborn | |
| 2003/0050884 A1 * | 3/2003 | Barnett | 705/35 |
| 2003/0074300 A1 | 4/2003 | Norris | |
| 2003/0120578 A1 | 6/2003 | Newman | |
| 2003/0158809 A1 | 8/2003 | Carney et al. | |
| 2004/0098327 A1 | 5/2004 | Seaman | |
| 2004/0117282 A1 * | 6/2004 | Green et al. | 705/35 |
| 2004/0162774 A1 | 8/2004 | Golden | |
| 2005/0055303 A1 | 3/2005 | Routtenberg | |
| 2005/0075976 A1 | 4/2005 | Woodruff et al. | |
| 2005/0086148 A1 | 4/2005 | Woodruff et al. | |

(Continued)

OTHER PUBLICATIONS

Barron's Financial Guides, "Dictionary of Finance and Investment Terms," Fifth Edition, 1998.*

(Continued)

*Primary Examiner*—Charles R Kyle
*Assistant Examiner*—David L Wood
(74) *Attorney, Agent, or Firm*—Lowenstein Sandler PC

(57) ABSTRACT

A bond comprises a coupon component that pays a periodic coupon during a first predetermined period of time until a maturity date of the coupon component without payment of any principal. The bond also comprises a call option component. The coupon and call option components are issued together in an initial issue of the bond. After the initial issue, the bond allows separation of the coupon component from the call option component and individual transfer of the coupon component and the call option component.

17 Claims, 3 Drawing Sheets

U.S. PATENT DOCUMENTS

| | | |
|---|---|---|
| 2005/0102206 A1 | 5/2005 | Savasoglu et al. |
| 2005/0160034 A1 | 7/2005 | Woodruff et al. |
| 2006/0117303 A1 | 6/2006 | Gizinski |
| 2007/0106588 A1 | 5/2007 | Kulak |

OTHER PUBLICATIONS

Michael J. Fleming and Kenneth D. Garbade. The Repurchase Agreement Refined: GCF Repo. Jun. 2003. Federal Reserve Bank of New York. vol. 9, No. 6, pp. 1-7.

Yoko Shibata, Repos provide Yanks with niche in Japan. Global Finance. Aug. 1994, vol. 8, Issue 8, pp. 17-22.

Ron Morrow. Repo, reverse repo and securities lending markets in Canada. Bank of Canada Review. Winter 1994/1995 pp. 61-72.

Frank Souder. The US repo and securities lending markets. International Securities Lending 1995-1996. pp. 225-227.

Repos rising. International Finance Law Review. London 2007, p. 1.

PSA has guidelines for CMO repos. National mortgage news. New York, Jan. 29, 1996, vol. 20 issue 17, p. 12.

Brad Finkelstein. Chase starting commercial MBS unit. National mortgage news. New York. Sep. 18, 1995, vol. 19, issue 48 pp. 1-4.

TCAM's new sec lending and repo system. International securities lending. London. Fourth quarter 1995. page 7.

Jennifer Ablan. Deutsche Bank Unit Launches Web Site for Research, Convertible-Bond Trading. Wall Street Journal (eastern ed.) NY, NY. Sep. 18, 2000, p. CI5.

\* cited by examiner

METHOD AND SYSTEM FOR EXCHANGEABLE BUNDLED OPTION AND NO-PRINCIPAL DEBT SECURITIES

BACKGROUND

The invention relates to the field of finance, and more particularly to financial instruments that combine multiple components.

Various finance structures are known, each with respective tax, accounting and rating agency advantages and disadvantages. What is needed are structures that enhance certain of these tax, accounting and rating agency advantages, without significantly impacting other features.

The preceding description is not to be construed as an admission that any of the description is prior art relative to the present invention.

SUMMARY OF THE INVENTION

In one aspect, the invention provides a bond that comprises a coupon component that pays a periodic coupon during a first predetermined period of time until a maturity date of the coupon component without payment of any principal. The bond also comprises a call option component. The coupon and call option components are issued together in an initial issue of the bond. After the initial issue, the bond allows separation of the coupon component from the call option component and individual transfer of the coupon component and the call option component.

In one aspect, the periodic coupon is a periodic fixed coupon. In one aspect, the periodic coupon is a periodic variable coupon. In one aspect, the call option component expires at the maturity date. In one aspect, the first predetermined period of time is between 15 and 30 years. In one aspect, the call option component is exercisable at a time after issue of the bond and before the maturity date. In one aspect, the call option component is exercisable at the maturity date. In one aspect, the coupon component has recourse to a company issuing the bond. In one aspect, the call option component has recourse to a bankruptcy remote entity formed by a company issuing the bond. In one aspect, the call option component has recourse to a company issuing the bond. In one aspect, the call option component is payable in cash. In one aspect, the call option component is payable in shares of a company issuing the bond. In one aspect, the call option component is payable in shares of a company other than a company issuing the bond. In one aspect, the call option component is only exercisable after a second predetermined period of time.

In one aspect, the invention provides a financial instrument with a first component and a second component that are issued together in an initial issue. The instrument comprises a right to receive periodic payments over a predetermined period of time until a maturity date without payment of any principal as pan of the first component. The instrument also comprises a right in the form of a call option to receive shares of the issuing company or a cash equivalent as pan of the second component. After the initial issue, the financial instrument allows separation of the first component from the second component and individual transfer of the first component and the second component.

In one aspect, the invention provides a method and system for raising funds comprising issuing a bond. The bond comprises a coupon component that pays a periodic coupon during a first predetermined period of time until a maturity date of the coupon component without payment of any principal. The bond also comprises a call option component. The coupon and call option components are issued together in an initial issue of the bond. After the initial issue, the bond allows separation of the coupon component from the call option component and individual transfer of the coupon component and the call option component. The system and method also comprise paying the periodic coupon, and determining whether the call option component has been exercised.

The foregoing specific aspects are illustrative of those which can be achieved, and are not intended to be exhaustive or limiting. Thus, the objects and advantages will be apparent from the description herein or can be learned from practicing the invention, both as embodied herein or as modified in view of any variations which may be apparent to those skilled in the art. Accordingly, the present invention resides in the novel parts, constructions, arrangements, combinations and improvements herein shown and described.

BRIEF DESCRIPTION OF THE DRAWINGS

The foregoing features and other aspects of the invention are explained in the following description taken in conjunction with the accompanying figures wherein.

Figure 1:
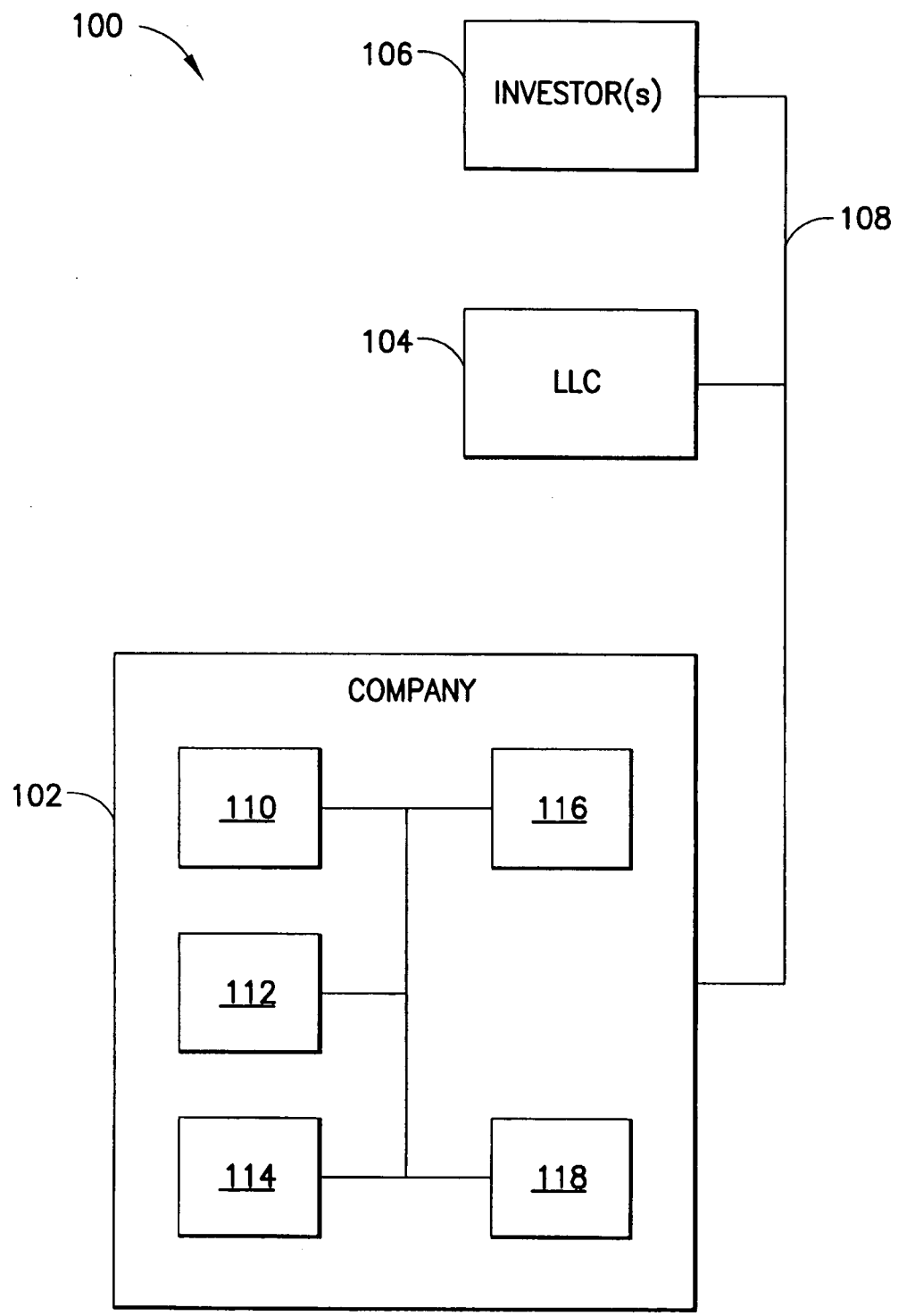
FIG. 1 illustrates a system according to one embodiment.

It is understood that the drawings are for illustration only and are not limiting.

DETAILED DESCRIPTION OF THE DRAWINGS

In the various embodiments described herein and illustrated in the drawings, a company forms a bankruptcy-remote limited liability company (LLC), and transfers shares to the LLC. A finance product is issued that includes a call option component on the shares transferred to the LLC, and a coupon component that pays a periodic coupon. The call option component and the coupon component are issued together in a initial issue, but may be separated later and transferred individually.

The coupon component does not pay or return any principal during the term or at maturity, but instead pays only the periodic coupon. The periodic coupon may be fixed or variable.

An Example System

Referring to FIG. 1, system 100 according to one embodiment includes company 102, special purpose vehicle ("SPV") or bankruptcy remote LLC 104, and investors 106. Company 102, LLC 104, and investors 106 are interconnected by network (LAN, WAN, intranet, extranet, pstn, the Internet, etc.) 108. Company 102 includes a computer with a central processing unit (CPU) 110, memory (RAM, ROM, etc.) 112, input/output devices (keyboards, displays, printers, pointing devices, etc.) 114, fixed and removable storage (hard drive, floppy drive, optical drive, etc.) 116, and network interface device (modem, Ethernet card, WiFi card, etc.) 118. Although not illustrated, LLC 104 and investors 106 also include a CPU 110, memory 112, input/output devices 114, fixed and removable storage 116, and network interface device 118. There are many possible embodiments for CPU 110, memory 112, input/output devices 114, fixed and removable storage 116, and network interface device 118, and their precise forms are not particular features of the embodiments described herein, and equivalents are clearly envisioned.

An Example Method

Figure 2:
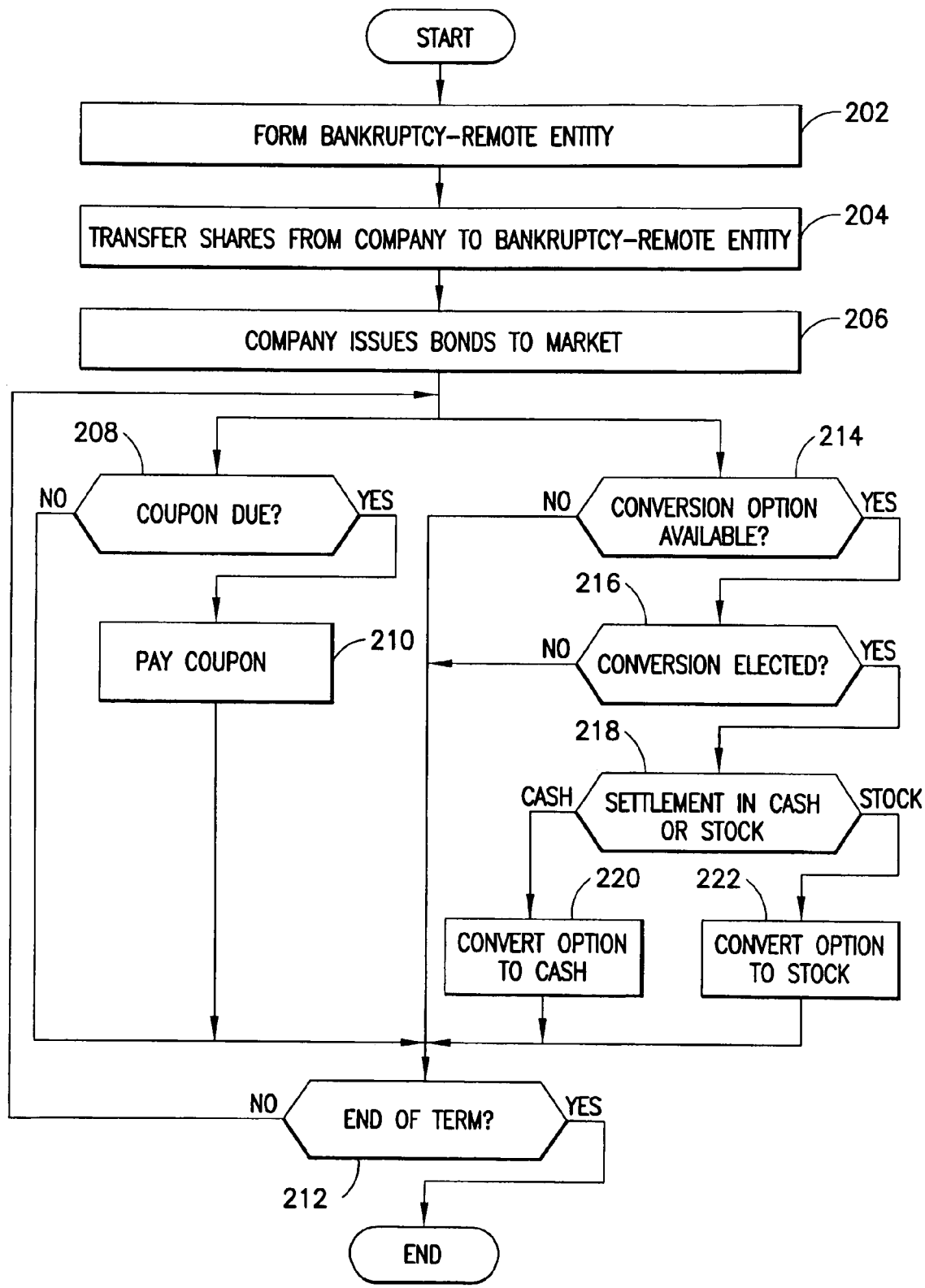
FIG. 2 illustrates steps in a method according to one embodiment.

Referring to FIG. 2, at step 202, company 102 forms a bankruptcy-remote entity, such as an LLC, or special purpose vehicle (SPV) 104. In one embodiment, the LLC will wind-up after a predetermined period of time, such as 30 years. In one embodiment, the LLC is structured so that company 102 controls all voting rights and share lending of LLC 104.

At step 204, company 102 transfers shares to LLC 104 in exchange for an ownership interest in the LLC. In one embodiment, the ownership interest is 100%, and in an example, 100 mm shares are transferred.

At step 206, exchangeable bundled option and no-principal debt securities ("X-Bonds") are issued to the market. In one embodiment, the X-Bonds are issued by company 102. In another embodiment, the X-Bonds are issued by LLC 104. The X-Bonds include a coupon component that pays a periodic coupon over a predetermined period of time, and a call option component. The coupon component only pays a coupon, and there is no payment of principal during the term or at maturity. The coupon component and the call option component are issued together in the initial issue of the X-Bonds. After issue, an X-Bond holder can separate the coupon component from the call option component, and transfer or sell them as individual components.

In one embodiment the coupon component pays a periodic fixed coupon over the term until maturity. In another embodiment the coupon component pays a periodic variable coupon over the term until maturity. In one embodiment, the 30 year maturity of the coupon component is the same length as the 30 year wind-up time of the LLC. In one embodiment, holders of the coupon component have recourse to company 102.

In one embodiment, the call option component expires at the end of a 30 year period, along with the 30 year wind-up time of the LLC, and is settled in net cash or net shares, at the election of company 102. In one embodiment, holders of the call option component have recourse to LLC 104, while in another embodiment, holders of the call option component have recourse to company 102.

At step 208, after initial issue, system 100 determines whether a coupon payment is due on the coupon component, and if so, the coupon is paid at step 210.

If at step 208 system 100 determines that a coupon payment is not due, then at step 212 system 100 determines whether the term of the coupon component is reached, and if not, loops to step 208.

At step 214, after initial issue, system 100 determines whether a conversion option is available for the call option component, and if so, then at step 216, system 100 determines whether the holder of the call option component has elected conversion. In one embodiment, the call option component is not exercisable during an initial period, such as _ years. If at step 216 system 100 determines that the holder of the call option component has elected conversion, then at step 218, system 100 determines whether the conversion is by cash or stock. At steps 220, 222, the call option component is converted to either cash or stock. In one embodiment, the determination of whether conversion is by cash or stock is by election of company 102.

Once convened, system 100 determines at step 212 whether the term has expired, and if not, loops to step 214.

If system 100 determines at steps 214 or 216 that a conversion option is not available, or the holder of the call option component has not elected conversion, then at step 212 system 100 determines whether the term has expired, and if not, loops to step 214.

Figure 3:
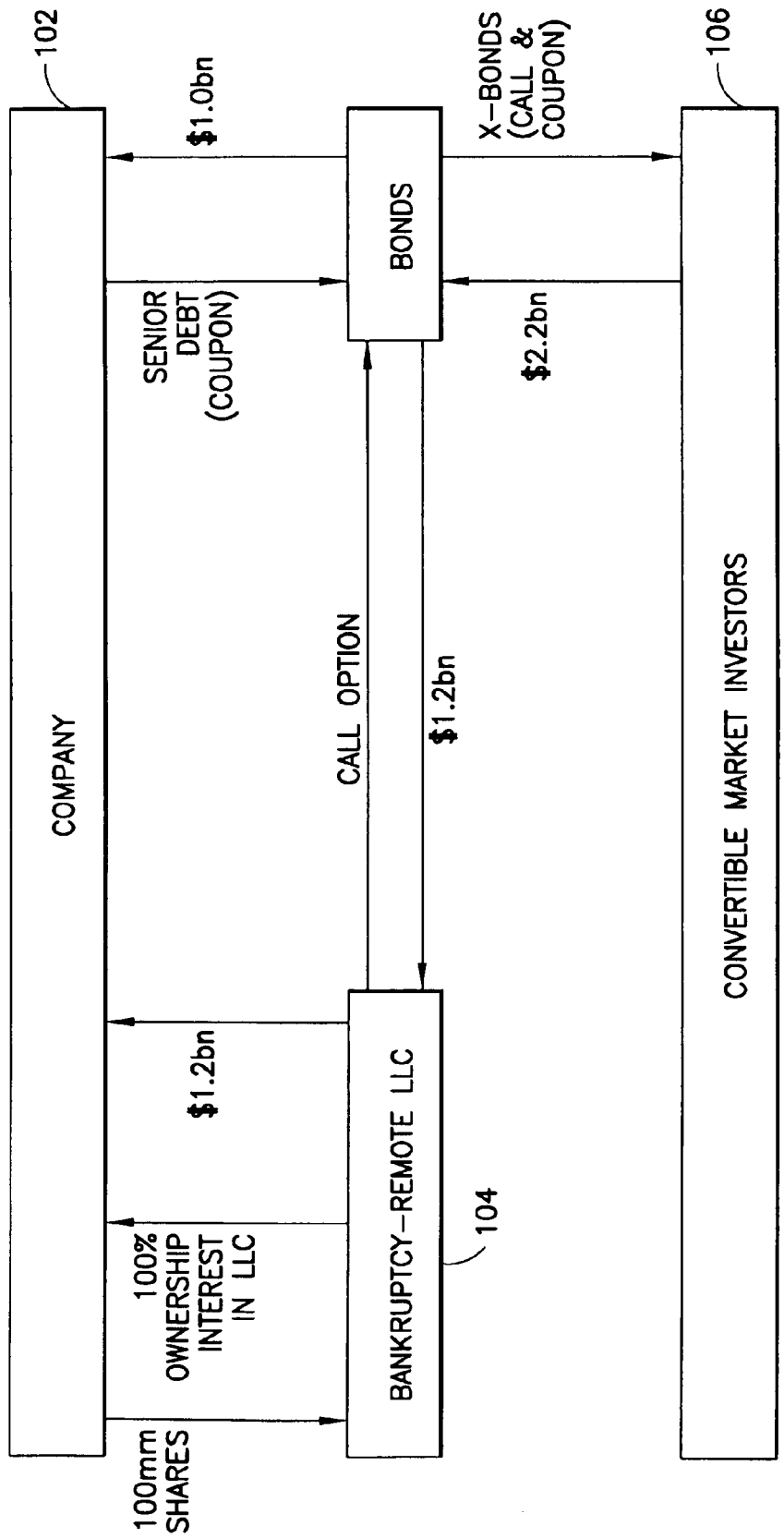
FIG. 3 illustrates relationships between parties according to one embodiment.

FIG. 3 illustrates some additional features of the embodiments and relationships between the parties along with an example.

After forming LLC 104, company 102 transfers 100 mm shares of company 102 stock to LLC 104. In exchange for that stock transfer, company 102 is the 100% owner of LLC 104.

At the time company 102 transfers the stock, the stock is worth $18 per share, making the stock transfer worth $1.8 bn.

The X-Bonds are issued to the market, where they are purchased by investors 106. The X-Bonds include the coupon component and the call option component. The coupon component pays a coupon (fixed or variable), but no principal over the 30 year term of the X-Bond, while the call option component allows the holder to convert the call option component to shares of company 102 stock at any time during the 30 year term of the X-Bond. In return for the coupon component and the call option component, investors 106 pay $22 for each X-Bond, which generates $2.2 bn from 100 mm X-Bonds. About $1.2 bn corresponds to the value of the call option component, and about $1.0 bn corresponds to the value of the coupon component. Although company 102 eventually receives all of the $2.2 bn proceeds, the $1.0 bn portion corresponding to the coupon component is treated as debt, while the $1.2 bn portion corresponding to the call option component is treated as an asset sale.

Company 102 transferred 100 mm shares of company 102 stock to LLC 104, and the 100 mm shares are subject to conversion if holders of the X-Bond call option components convert them. Therefore, recourse on the call option component is to LLC 104. It is also possible that recourse on the call option component is to company 102.

Company 102 is responsible for payment of the coupon component of the X-Bonds, and therefore recourse on the coupon component is to company 102.

This structure has tax efficiencies because the debt component provides current deductions at company 102's cost of funds. There is no interest capitalization and no tax recapture. Further, this provides an economic hedge with up to 30 years of capital gains tax deferral.

For accounting purposes the structure also has advantages. Company 102 recognizes the sale of shares under FAS 140. This provides less balance sheet use than traditional exchangeables, and retains an asset representing residual exposure to the underlying shares. The debt is recorded separately and does not include the call option liability.

From a rating agency perspective, the structure also has advantages. Only about $1 bn of debt is recorded on the balance sheet, as compared to $2.2 bn for a traditional exchangeable.

In the above-described embodiments, company 102 transfers stock of their own company to LLC 104. In another embodiment, company 102 transfers stock of another company (e.g., company Y) to LLC 104, while retaining a 100% ownership interest in LLC 104 in return for the stock transfer. In this embodiment, the call option component allows conversion of the call option for stock of company Y. This embodiment might be used where company 102 owns stock in company Y and wants to take advantage of that stock ownership to raise capital, while retaining ownership or control of company Y stock until the call option components of the X-Bonds are exercised.

Although illustrative embodiments have been described herein in detail, it should be noted and will be appreciated by those skilled in the art that numerous variations may be made within the scope of this invention without departing from the principles of this invention and without sacrificing its chief advantages.

Unless otherwise specifically stated, the terms and expressions have been used herein as terms of description and not terms of limitation. There is no intention to use the terms or expressions to exclude any equivalents of features shown and described or portions thereof and this invention should be defined in accordance with the claims that follow.

We claim:

1. A method implemented at least partially in a programmed computer for raising funds, the method comprising:
  issuing a bond using the programmed computer, wherein the bond comprises:
    a first component, corresponding to interest due on the bond, that pays a periodic interest payment during a first predetermined period of time until a maturity date of the first component without payment of any principal; and
    a second component, corresponding to principal due on the bond, allowing a holder of the second component to elect conversion and thereby receive shares of a company or a cash equivalent as part of the second component, the first and second components issued together in an initial issue of the bond, wherein after the initial issue, the bond allows separation of the first component from the second component and individual transfer of the first component and the second component, and further wherein a conversion of the second component to shares or cash equivalent does not alter the periodic interest coupon payments of the first component;
  paying the periodic interest payment using the programmed computer; and
  automatically determining whether the second component has been exercised.

2. A method according to claim 1, wherein the periodic interest payment pays a fixed interest rate at a fixed interval.

3. A method according to claim 1, wherein the periodic interest payment pays a variable interest rate at a fixed interval.

4. A method according to claim 1, wherein the second component expires at the maturity date.

5. A method according to claim 1, wherein the first predetermined period of time is between 15 and 30 years.

6. A method according to claim 1, wherein the second component is exercisable at a time after issue of the bond and before the maturity date.

7. A method according to claim 1, wherein the second component is exercisable at the maturity date.

8. A method according to claim 1, wherein the first component has recourse to a company issuing the bond.

9. A method according to claim 1, wherein the second component has recourse to a bankruptcy remote entity formed by a company issuing the bond.

10. A method according to claim 1, wherein the second component has recourse to a company issuing the bond.

11. A method according to claim 1, wherein the second component is payable in cash.

12. A method according to claim 1, wherein the second component is payable in shares of a company issuing the bond.

13. A method according to claim 1, wherein the second component is payable in shares of a company other than a company issuing the bond.

14. A method according to claim 1, wherein the second component is only exercisable after a second predetermined period of time.

15. A computer usable medium having computer executable program code embodied in said medium for causing a programmed computer to execute a program for raising funds, the code comprising:
  code to issue a bond, wherein the bond comprises:
    a first component, corresponding to interest due on the bond, that pays a periodic interest payment during a first predetermined period of time until a maturity date of the first component without payment of any principal; and
    a second component, corresponding to principal due on the bond, allowing a holder of the second option component to elect conversion and thereby receive shares of a company or a cash equivalent as part of the second option component, the first and second components issued together in an initial issue of the bond, wherein after the initial issue, the bond allows separation of the first component from the second component and individual transfer of the first component and the second component, and further wherein a conversion of the second component to shares or cash equivalent does not alter the periodic interest coupon payments of the first component;
  code to pay the periodic interest payment; and
  code to determine whether the second component has been exercised.

16. A programmed computer for raising funds, comprising:
  a memory having at least one region for storing computer executable program code; and
  a processor for executing the program code stored in the memory, wherein the program code comprises:
  code to issue a bond, wherein the bond comprises:
    a first component, corresponding to interest due on the bond, that pays a periodic interest payment during a first predetermined period of time until a maturity date of the first component without payment of any principal; and
    a second component, corresponding to principal due on the bond, allowing a holder of the second component to elect conversion and thereby receive shares of a company or a cash equivalent as part of the second component, the first and second components issued together in an initial issue of the bond, wherein after the initial issue, the bond allows separation of the first component from the second component and individual transfer of the first component and the second component, and further wherein a conversion of the second component to shares or cash equivalent does not alter the periodic interest payments of the first component;
  code to pay the periodic interest payment; and
  code to determine whether the second component has been exercised.

17. A system for raising funds comprising:
  a programmed computer for issuing a bond, wherein the bond comprises:
    a first component, corresponding to interest due on the bond, that pays a periodic interest payment during a first predetermined period of time until a maturity date of the first component without payment of any principal; and
    a second component, corresponding to principal due on the bond, allowing a holder of the second component to elect conversion and thereby receive shares of a company or a cash equivalent as part of the second component, the first and second components issued together in an initial issue of the bond, wherein after the initial issue, the bond allows separation of the first component from the second component and individual transfer of the first component and the second component, and further wherein a conversion of the second component to shares or cash equivalent does not alter the periodic interest payments of the first component;
  a programmed computer for paying the periodic interest; and
  a programmed computer for determining whether the second component has been exercised.

* * * * *

UNITED STATES PATENT AND TRADEMARK OFFICE
CERTIFICATE OF CORRECTION

PATENT NO. : 7,590,590 B2  Page 1 of 1
APPLICATION NO. : 11/168679
DATED : September 15, 2009
INVENTOR(S) : Sreenivasan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 612 days.

Signed and Sealed this

Twenty-first Day of September, 2010

David J. Kappos
*Director of the United States Patent and Trademark Office*